United States Patent
Kodama et al.

(10) Patent No.: US 9,691,436 B2
(45) Date of Patent: Jun. 27, 2017

(54) TOP COVER AND DISK DRIVE APPARATUS

(71) Applicant: Nidec Corporation, Kyoto (JP)

(72) Inventors: Mitsuo Kodama, Kyoto (JP); Hiroyuki Abe, Kyoto (JP); Katsuya Takahashi, Kyoto (JP); Yuya Saito, Kyoto (JP); Masahiro Shiraishi, Kyoto (JP); Yoshinobu Arao, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/229,221

(22) Filed: Aug. 5, 2016

(65) Prior Publication Data
US 2017/0047097 A1  Feb. 16, 2017

(30) Foreign Application Priority Data
Aug. 10, 2015  (JP) .................... 2015-157882

(51) Int. Cl.
*G11B 33/14* (2006.01)
*G11B 25/04* (2006.01)

(52) U.S. Cl.
CPC .......... *G11B 33/148* (2013.01); *G11B 25/043* (2013.01)

(58) Field of Classification Search
None
See application file for complete search history.

(56) References Cited

U.S. PATENT DOCUMENTS

| 5,214,549 | A  | * | 5/1993 | Baker | G11B 33/08 360/98.01 |
| 6,888,697 | B1 | * | 5/2005 | Oveyssi | G11B 33/08 360/97.16 |
| 6,894,866 | B2 | * | 5/2005 | Nishijima | G11B 5/6005 360/99.18 |
| 7,106,553 | B2 | * | 9/2006 | Kim | G11B 33/1446 360/99.16 |
| 2003/0218829 | A1 | * | 11/2003 | Hong | G11B 33/146 360/97.22 |
| 2006/0114603 | A1 | * | 6/2006 | Ser | G11B 25/043 360/97.13 |
| 2007/0264123 | A1 |   | 11/2007 | Yoshida | |

(Continued)

FOREIGN PATENT DOCUMENTS

| JP | 2001110175 A | * | 4/2001 |
| JP | 2002157858 A | * | 5/2002 |
| JP | 2003-317435 A |   | 11/2003 |

(Continued)

OTHER PUBLICATIONS

English-machine translation of JP 2001-110175 A to Imasaka, published on Apr. 20, 2001.*

(Continued)

*Primary Examiner* — Will J Klimowicz
(74) *Attorney, Agent, or Firm* — Keating & Bennett, LLP

(57) ABSTRACT

A case of a disk drive apparatus includes a housing in which a disk is accommodated, and a top cover arranged to close an opening of the housing. The top cover includes a top cover body and a flow control member. The top cover body is a plate-shaped member arranged to extend perpendicularly to a central axis. The flow control member is fixed to a lower surface of the top cover body. The flow control member includes a lower surface arranged axially opposite to at least a portion of an upper surface of the disk.

11 Claims, 9 Drawing Sheets

(56) References Cited

U.S. PATENT DOCUMENTS

2008/0094748 A1* 4/2008 Han ............... G11B 5/6005
                                                360/97.13
2008/0278849 A1* 11/2008 Kwon ............. G11B 25/043
                                                360/97.19

FOREIGN PATENT DOCUMENTS

| JP | 2003331562 A | * | 11/2003 | |
|----|---|---|---|---|
| JP | 2004-046964 A | | 2/2004 | |
| JP | 2004192750 A | * | 7/2004 | |
| JP | 2005071587 A | * | 3/2005 | |
| JP | 2006179118 A | * | 7/2006 | |
| JP | 2011018391 A | * | 1/2011 | |
| JP | 2011086374 A | * | 4/2011 | |
| KR | EP 1336969 A2 | * | 8/2003 | ......... G11B 33/1486 |

OTHER PUBLICATIONS

English-machine translation of JP 2003-331562 A to Choi, published on Nov. 21, 2003.*

* cited by examiner

TOP COVER AND DISK DRIVE APPARATUS

BACKGROUND OF THE INVENTION

1. Field of the Invention

The present invention relates to a top cover and a disk drive apparatus.

2. Description of the Related Art

A disk drive apparatus, such as, for example, a hard disk drive (hereinafter referred to simply as an HDD), is known. For the disk drive apparatus to perform high-speed data processing, it is necessary to increase the rotational speed of a disk. However, if the disk is caused to rotate at a high speed, an air flow traveling in the same direction as a rotation direction of the disk occurs. If this air flow is disturbed, a phenomenon called disk flutter, i.e., vibration of the disk, occurs. This disk flutter may cause, for example, noise and/or a reduction in precision of a write to the disk.

A known disk drive apparatus includes a disk clamper having an increased outside diameter and arranged to fix a disk to a hub of a motor, and this disk clamper is arranged to rotate together with the disk with an optimum interspace maintained between the disk clamper and the disk to control an air flow in the vicinity of the disk to reduce the disk flutter.

Another known disk drive apparatus includes a case body in which a disk and a carriage are accommodated, and a top cover arranged to close an opening of the case body, and the top cover is provided with a rib extending continuously over an entire circumferential extent with a specific area corresponding to the disk as a center. The top cover thus increased in rigidity reduces noise which accompanies rotation of the disk as a secondary effect.

However, neither of the above known disk drive apparatuses is configured with consideration given to the relationship between noise and an axial distance between the top cover of the disk drive apparatus and the disk. A larger axial distance between the top cover and the disk tends to cause greater noise while the disk drive apparatus is in operation. One possible cause of this noise is fluttering of the disk which accompanies the rotation of the disk.

SUMMARY OF THE INVENTION

A top cover according to a preferred embodiment of the present invention is used in a disk drive apparatus arranged to rotate a disk about a central axis extending in a vertical direction to close an opening of a housing in which the disk is accommodated. The top cover includes a plate-shaped top cover body arranged to extend perpendicularly to the central axis, and a flow control member fixed to a lower surface of the top cover body. The top cover body is arranged axially opposite to the disk. The flow control member includes a lower surface arranged axially opposite to at least a portion of an upper surface of the disk.

According to the above preferred embodiment of the present invention, an axial gap between the disk and the top cover is narrowed. This leads to a reduction in fluttering of the disk during rotation. This in turn leads to a reduction in noise while the disk drive apparatus is in operation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that an axial direction is a vertical direction, and that a side on which a top cover is arranged with respect to a housing is defined as an upper side. The shape of each member or portion and relative positions of different members or portions will be described based on the above assumptions. It should be noted, however, that the above definitions of the vertical direction and the upper and lower sides are not meant to restrict in any way the orientation of a top cover or a disk drive apparatus according to any preferred embodiment of the present invention when in use.

Figure 1:
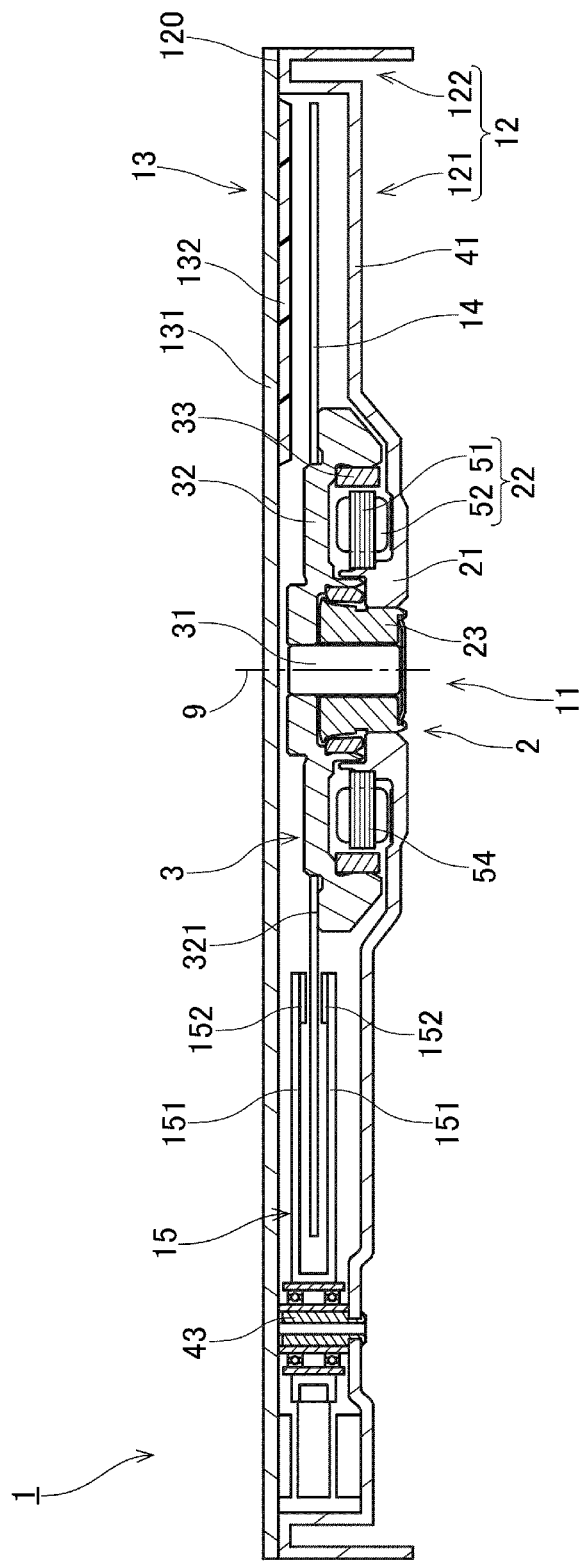
FIG. 1 is a vertical cross-sectional view of a disk drive apparatus according to a preferred embodiment of the present invention.
Figure 2:
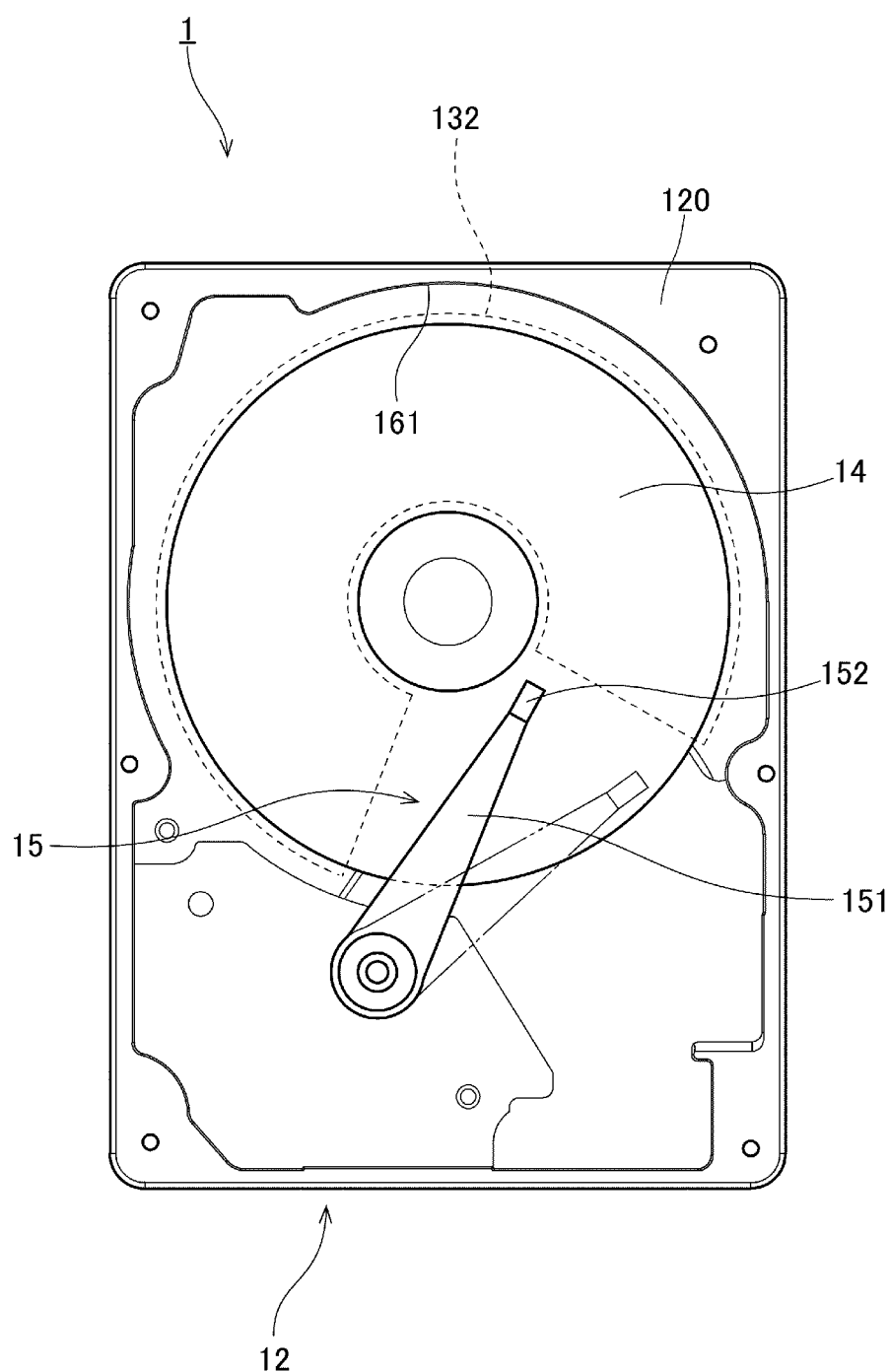
FIG. 2 is a top view of the disk drive apparatus according to a preferred embodiment of the present invention with a top cover removed therefrom.

FIG. 1 is a vertical cross-sectional view of a disk drive apparatus 1 according to a first preferred embodiment of the present invention. FIG. 2 is a top view of the disk drive apparatus 1 with a top cover 13 removed therefrom.

The disk drive apparatus 1 is an apparatus arranged to rotate a magnetic disk 14 (hereinafter referred to simply as the "disk 14"), which is in the shape of a circular disk and includes a central circular hole, and perform reading and writing of information from or to the disk 14. Referring to FIG. 1, the disk drive apparatus 1 includes a spindle motor 11, a housing 12, the top cover 13, the disk 14, and an access portion 15.

The spindle motor 11 is arranged to rotate the disk 14 about a central axis 9 while supporting the disk 14. The spindle motor 11 includes a stationary portion 2 and a rotating portion 3. The stationary portion 2 is arranged to be stationary relative to the housing 12. The rotating portion 3 is supported to be rotatable with respect to the stationary portion 2.

The stationary portion 2 includes a base portion 21, a stator 22, and a bearing unit 23. The base portion 21 is arranged to extend substantially perpendicularly to the central axis 9 below the rotating portion 3 and the disk 14. The base portion 21 is a portion of the spindle motor 11, and is also a portion of the housing 12. Each of the stator 22 and the bearing unit 23 is fixed to the base portion 21. The stator 22 includes a stator core 51 made of a magnetic material, and a plurality of coils 52. The stator core 51 includes a plurality of teeth 54 arranged to project radially outward. Each of the coils 52 is defined by a conducting wire wound around a separate one of the teeth 54. The bearing unit 23 is arranged to rotatably support a shaft 31, which is included in the rotating portion 3. A fluid dynamic bearing mechanism, for example, is used as the bearing unit 23.

The rotating portion 3 includes the shaft 31, a hub 32, and a magnet 33. The shaft 31 is a columnar member arranged to extend in the axial direction. A lower end portion of the shaft is accommodated inside the bearing unit 23. The hub 32 is arranged to extend radially outward from a periphery of an upper end portion of the shaft 31. The hub 32 includes a support surface 321 arranged to support the disk 14. The magnet 33 is fixed to the hub 32 radially outside of the stator 22. The magnet 33 is annular. An inner circumferential surface of the magnet 33 includes north and south poles arranged to alternate with each other in a circumferential direction.

Once electric drive currents are supplied to the coils 52 in the spindle motor 11 as described above, magnetic flux is generated around each of the teeth 54. Then, interaction between the magnetic flux of the teeth 54 and that of the magnet 33 produces a circumferential torque, so that the rotating portion 3 is caused to rotate about the central axis 9 with respect to the stationary portion 2. The disk 14 supported by the hub 32 is caused to rotate about the central axis 9 together with the rotating portion 3.

The housing 12 includes a bottom portion 121, which includes the aforementioned base portion 21, and a wall portion 122. The bottom portion 121 is arranged to extend substantially perpendicularly to the central axis 9. Each of the spindle motor 11 and the access portion 15 is supported by the bottom portion 121. The wall portion 122 is arranged to extend upward from an outer edge of the bottom portion 121 to assume the shape of a rectangular tube. The wall portion 122 includes an annular cover support surface 120 at an upper end thereof. The top cover 13 is supported on the cover support surface 120, and is fixed to the housing 12 through, for example, screws or the like. An upper opening of the housing 12 is closed by the top cover 13. The housing 12 and the top cover 13 together define a case. The rotating portion 3 of the spindle motor 11, the disk 14, and the access portion 15 are contained in this case.

The access portion 15 includes arms 151 and heads 152, which are arranged at tips of the arms 151. Each arm 151 is arranged to rotate about a support 43 arranged to extend in the axial direction from the bottom portion 121. Each head 152 is thus arranged to move along a recording surface of the disk 14. The heads 152 are arranged opposite to an upper surface and a lower surface of the disk 14, and are arranged to perform reading and writing of information from or to the disk 14. Note that each head 152 may alternatively be arranged to perform only one of the reading and the writing of information from or to the disk 14. Also note that the disk drive apparatus 1 may alternatively be arranged to include two or more disks 14. Also note that the disk drive apparatus 1 may alternatively be an apparatus arranged to rotate an optical disk.

Figure 3:
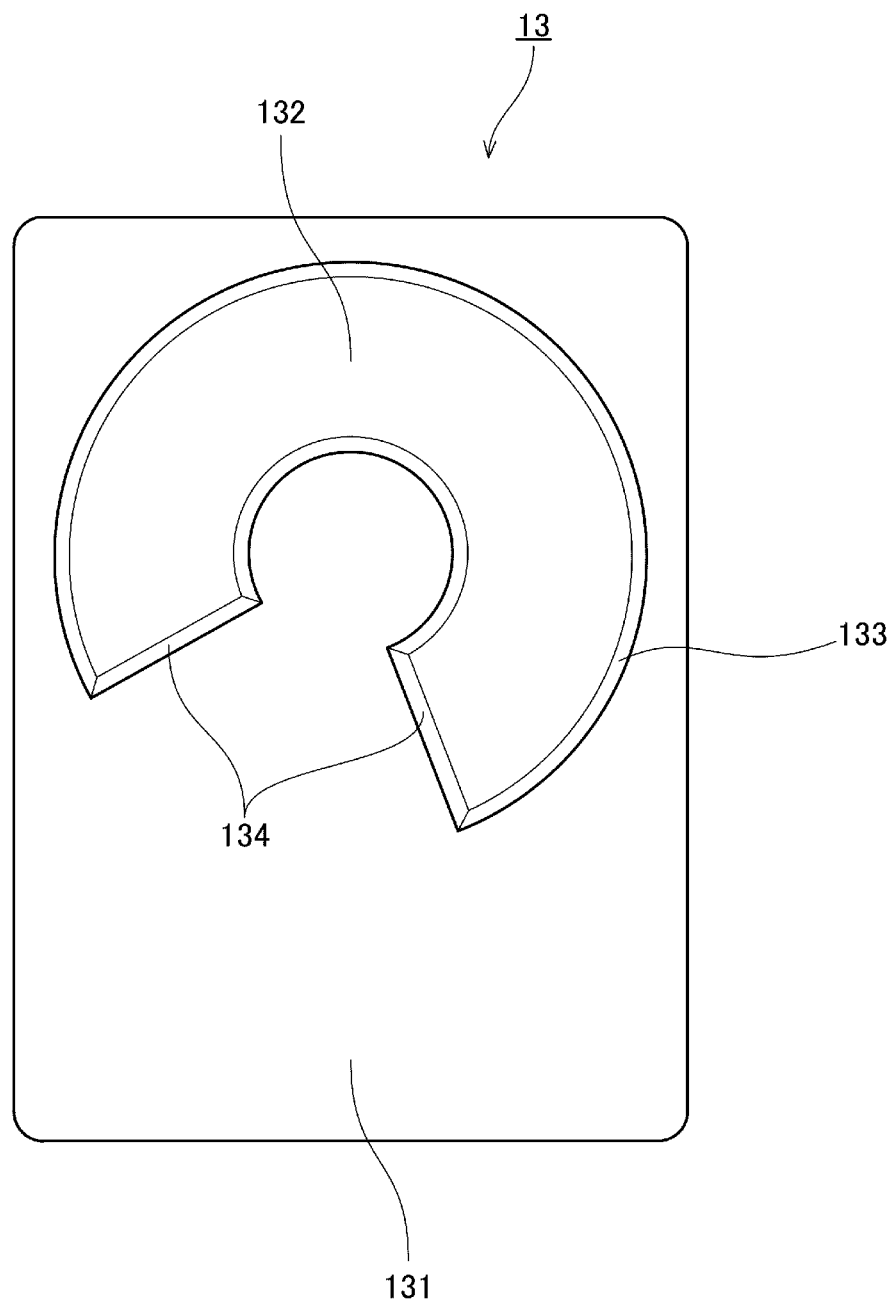
FIG. 3 is a bottom view of the top cover according to a preferred embodiment of the present invention.
Figure 4:
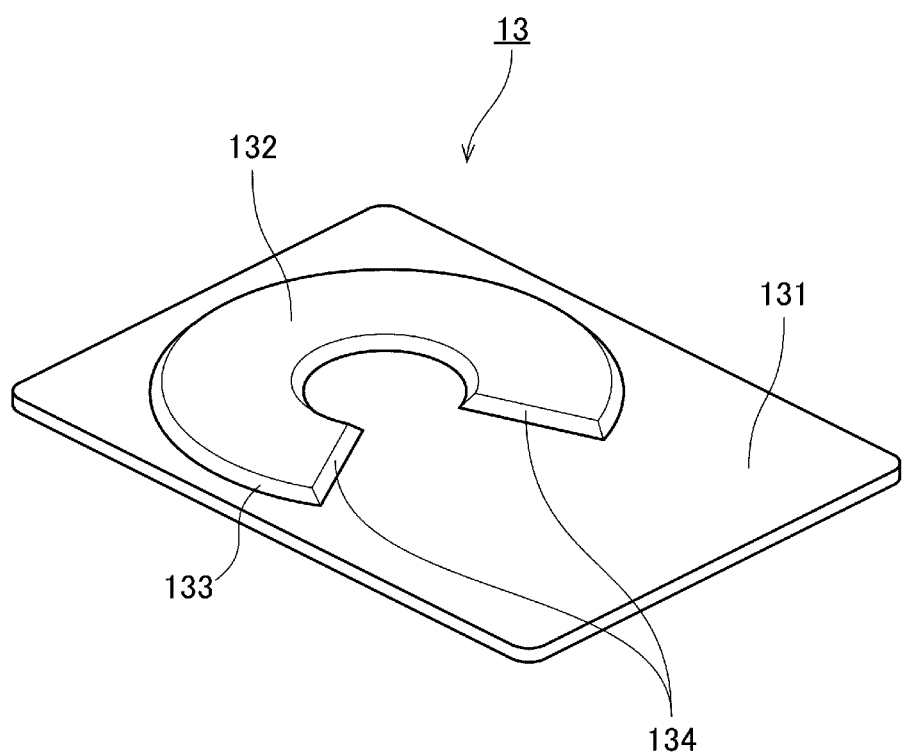
FIG. 4 is a perspective view of the top cover according to a preferred embodiment of the present invention.
Figure 5:
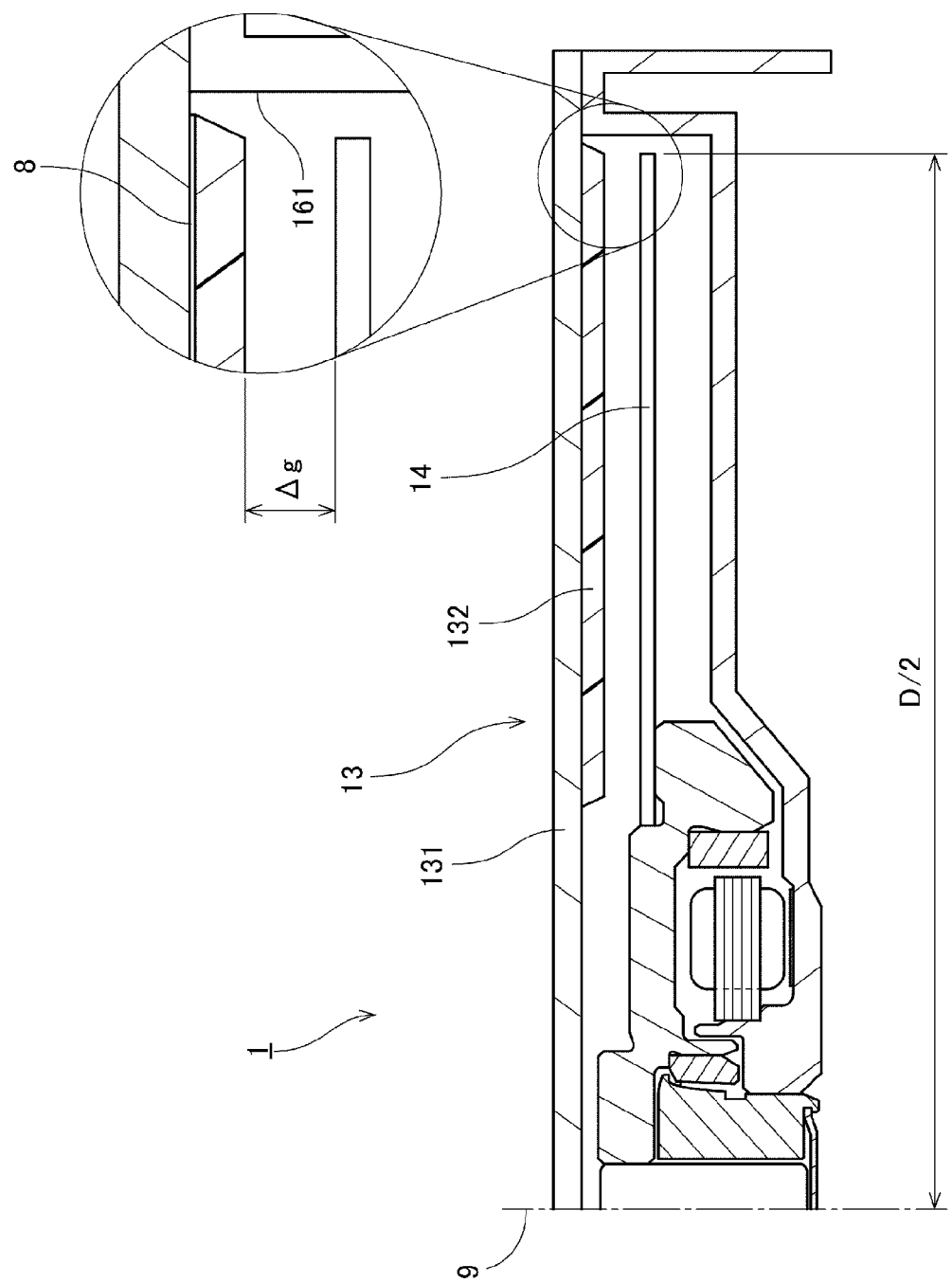
FIG. 5 is a partial vertical cross-sectional view of the disk drive apparatus according to a preferred embodiment of the present invention.

Next, the structure of the top cover 13 will now be described in detail below. FIG. 3 is a bottom view of the top cover 13. FIG. 4 is a perspective view of the top cover 13. FIG. 5 is a partial vertical cross-sectional view of the disk drive apparatus 1.

Referring to FIGS. 1, 3, 4, and 5, the top cover 13 includes a top cover body 131 and a flow control member 132. The top cover body 131 is a plate-shaped member arranged to extend perpendicularly to the central axis 9. Each of the top cover body 131 and the housing 12 is arranged to have a substantially equal size in a plan view. A lower surface of a peripheral portion of the top cover body 131 is arranged to be in contact with the cover support surface 120 of the housing 12. The upper surface of the disk 14 and a lower surface of the top cover body 131 are arranged axially opposite to each other.

The flow control member 132 is a plate-shaped member fixed to the lower surface of the top cover body 131. A resin, for example, is used as a material of the flow control member 132. The flow control member 132 includes a lower surface arranged axially opposite to at least a portion of the upper surface of the disk 14. An axial distance between the upper surface of the disk 14 and the lower surface of the flow control member 132 is smaller than an axial distance between the upper surface of the disk 14 and the lower surface of the top cover body 131.

Referring to an enlarged portion of FIG. 5, the flow control member 132 is fixed to the lower surface of the top cover body 131 through an adhesive 8. An epoxy adhesive having a thermosetting property, for example, is used as the adhesive 8. Note that the adhesive 8 may possess an anaerobic property, a UV-curing property, or the like. Use of the adhesive 8 enables the top cover body 131 and the flow control member 132 to be fixed to each other more easily and at a lower cost than use of other fixing methods. Note that the flow control member 132 may alternatively be fixed to the top cover body 131 by another method, such as heat welding.

Note that the flow control member 132 may alternatively be defined by an injection molding process with the top cover body 131 as an insert (i.e., by an insert molding process). Use of the insert molding process makes it possible to shape the flow control member 132 easily in accordance with unevenness of the lower surface of the top cover body 131 even when the lower surface of the top cover body 131 is uneven.

The flow control member 132 arranged on the lower surface of the top cover body 131 as described above narrows an axial gap between the disk 14 and the top cover 13. This makes a volume change less likely to occur in a gas layer intervening between the disk 14 and the top cover 13. This in turn makes fluttering of the disk 14 during rotation (i.e., disk flutter) less likely to occur. A reduced likelihood of the fluttering of the disk 14 during rotation leads to reductions in vibration and noise which occur while the disk drive apparatus 1 is in operation.

In FIG. 2, the location of the flow control member 132 is shown by a broken line. Referring to FIGS. 2, 3, and 4, the flow control member 132 according to this preferred embodiment is in the shape of a circular arc and is centered on the central axis 9. In addition, as illustrated in FIG. 2, the flow control member 132 is arranged to overlap with the disk 14 in a plan view, and is arranged outside of a range over which the arms 151 and the heads 152 move in the plan view. Thus, the flow control member 132 is arranged not to interfere with any of the arms 151 and the heads 152.

The flow control member 132 and each of the arms 151 and the heads 152 do not restrict the axial position of each other. Accordingly, each of the arms 151 and the heads 152 may be arranged at the same level as that of the flow control member 132. For example, at least a portion of each of the arms 151 and the heads 152 may be arranged to radially and circumferentially overlap with at least a portion of the flow control member 132. This makes it possible to arrange the lower surface of the flow control member 132 closer to the upper surface of the disk 14. This contributes to further reducing the fluttering of the disk 14 during rotation.

To reduce the fluttering of the disk 14 during rotation, the flow control member 132 is preferably arranged to cover as large an area of the upper surface of the disk 14 as possible without interfering with any of the arms 151 and the heads 152. It is therefore preferable to make the central angle of the flow control member 132 in the shape of a circular arc 180° or greater, for example, to ensure a large area of the lower surface of the flow control member 132.

The disk 14 tends to experience an axial displacement due to fluttering most easily at an outer circumferential end portion thereof. Therefore, at least a portion of the lower surface of the flow control member 132 is preferably arranged axially opposite to an outer circumferential end portion of the upper surface of the disk 14 as illustrated in FIGS. 2 and 5. This contributes to preventing the disk 14 from experiencing an axial displacement at the outer circumferential end portion thereof, at which a displacement of the disk 14 tends to occur most easily. The fluttering of the disk 14 can thus be reduced.

Referring to FIGS. 3 to 5, the flow control member 132 includes a first slanting surface 133 at least at a portion of a periphery of the lower surface of the flow control member 132. The first slanting surface 133 is arranged to become gradually more distant from the upper surface of the disk 14 with increasing distance from the central axis 9. This arrangement provides a gentle shoulder at a peripheral portion of the flow control member 132. This contributes to preventing an occurrence of gas turbulence, and to further reducing noise which occurs while the disk drive apparatus 1 is in operation. In the case where the flow control member 132 is produced by a resin molding process, the first slanting surface 133 makes it easier to separate the molded flow control member 132 from a mold.

Referring to FIGS. 3 and 4, the flow control member 132 includes second slanting surfaces 134 at both circumferential end portions thereof. Once the disk 14 starts rotating, a circumferential air flow component occurs between the disk 14 and the top cover 13. If this air flow component struck a vertical shoulder surface of the flow control member 132, noise might be caused. However, when both circumferential end portions of the flow control member 132 include the second slanting surfaces 134 as in this preferred embodiment, the circumferential air flow component flows along the second slanting surfaces 134. Accordingly, the second slanting surfaces 134 contribute to preventing an occurrence of gas turbulence near both circumferential end portions of the flow control member 132, and to further reducing noise which occurs while the disk drive apparatus 1 is in operation.

Note that the second slanting surface 134 may alternatively be defined at only one of the circumferential end portions of the flow control member 132. In this case, the second slanting surface 134 is preferably defined at one of the circumferential end portions of the flow control member 132 which faces in a direction opposite to a rotation direction of the disk 14. In the case where the disk 14 is arranged to rotate in a clockwise direction, for example, the second slanting surface 134 is preferably defined at a counterclockwise end portion of the flow control member 132. In the case where the disk 14 is arranged to rotate in a counterclockwise direction, the second slanting surface 134 is preferably defined at a clockwise end portion of the flow control member 132.

Referring to FIGS. 2 and 5, the housing 15 includes an inner wall surface 161 in the shape of a circular arc and arranged to surround the disk 14. Each of an outer edge surface of the disk 14 and an outer edge surface of the flow control member 132 is arranged radially opposite to the inner wall surface 161 with a gap therebetween. Once the top cover 13 is fitted to the housing 12, the flow control member 132 is arranged inside of the inner wall surface 161. The radial gap between the flow control member 132 and the inner wall surface 161 makes it easy to arrange the flow control member 132 inside of the inner wall surface 161 at this time.

As mentioned above, the flow control member 132 of the disk drive apparatus 1 reduces the axial distance between the disk and the top cover 13 to reduce noise while the disk drive apparatus 1 is in operation. However, too small an axial distance between the flow control member 132 and the disk 14 would cause an increase in resistance against the rotation of the disk 14 due to windage, leading to an increased power consumption of the disk drive apparatus 1. To combine a reduction in noise with a reduction in power consumption, it is preferable to make the axial distance between the flow control member 132 and the disk 14 an appropriate distance.

For example, referring to FIG. 5, assuming that the diameter of the disk 14 is denoted as D and the axial distance between the lower surface of the flow control member 132 and the upper surface of the disk 14 is denoted as Δg, D and Δg preferably satisfy the following relationship: 0.01≤Δg/D≤0.03. In the case of a 3.5-inch HDD, for example, D=95 mm, and therefore, the following relationship is preferably satisfied: 0.95 mm≤Δg≤2.85 mm. In the case of a 2.5-inch HDD, D=64 mm, and therefore, the following relationship is preferably satisfied: 0.64 mm≤Δg≤1.92 mm.

Figure 6:
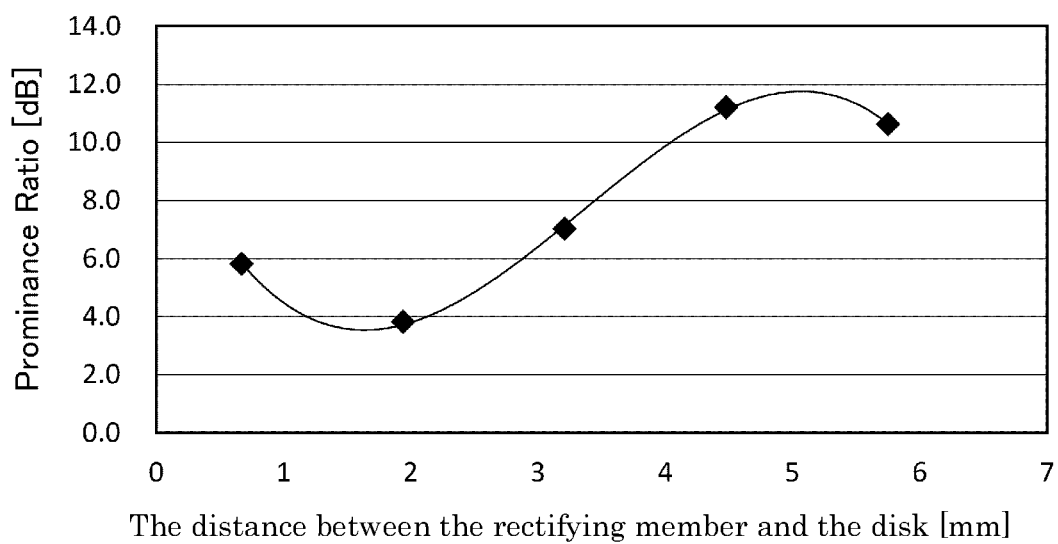
FIG. 6 shows a graph showing the relationship between a prominence ratio and the distance between a flow control member and a disk.

FIG. 6 shows a graph showing the relationship between the aforementioned distance Δg between the flow control member 132 and the disk 14 and the value of a prominence ratio concerning the disk drive apparatus 1. The horizontal axis in FIG. 6 represents the axial distance Δg between the lower surface of the flow control member 132 and the upper surface of the disk 14. The vertical axis in FIG. 6 represents the value of the prominence ratio in a specific frequency range. The prominence ratio indicates the proportion of prominent discrete frequency noise in an audible frequency range, and is used as a measure to assess the characteristics of operating noise. Reducing the prominence ratio leads to an improvement in the characteristics of the operating noise.

The graph in FIG. 6 shows that the value of the prominence ratio tends to decrease on the whole as the value of Δg decreases. The graph in FIG. 6 also shows that the prominence ratio takes the lowest value when the value of the distance Δg is about 2 mm. This shows that a reduction in the aforementioned distance Δg by use of the flow control member 132 leads to a reduction in the value of the prominence ratio, reducing the noise which occurs while the disk drive apparatus 1 is in operation.

Figure 7:
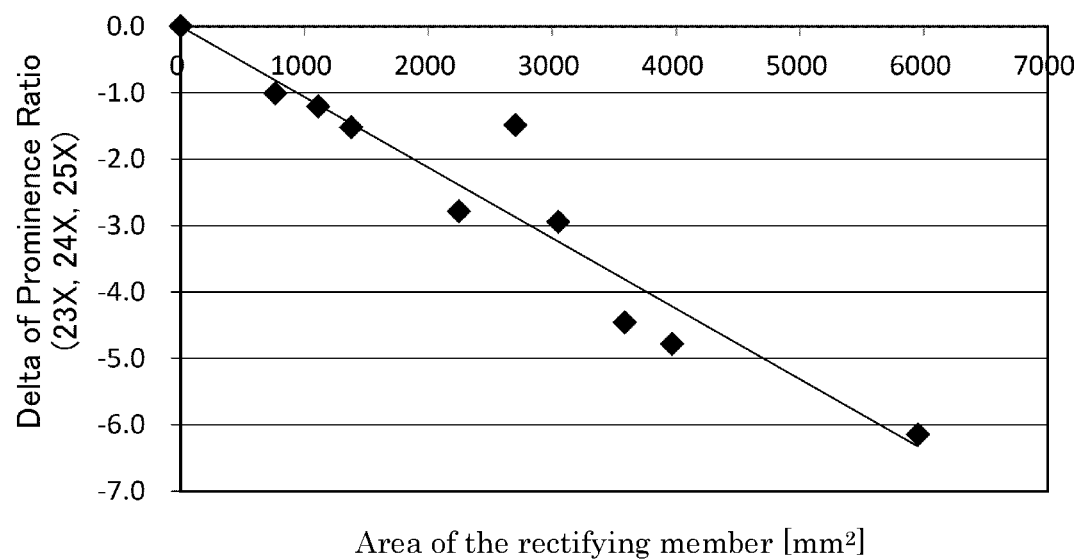
FIG. 7 shows a graph showing the relationship between the area of the flow control member in a plan view and the amount of change in the prominence ratio.

FIG. 7 shows a graph showing the relationship between the area of the flow control member 132 in the plan view and the amount of change in the prominence ratio concerning the disk drive apparatus 1. The horizontal axis in FIG. 7 represents the area of the flow control member 132 in the plan view. The vertical axis in FIG. 7 represents the numerical value obtained by subtracting the value of the prominence ratio of that one of 23rd-order, 24th-order, and 25th-order frequency components, i.e., magnetic frequencies of the motor, which exhibits the highest prominence ratio from the value of the prominence ratio of a disk drive apparatus which does not include the flow control member. That is, the vertical axis in FIG. 7 represents the degree of a reduction in the value of the prominence ratio against the area of the flow control member in the plan view. Note that FIG. 7 shows measurements in the case where the flow control member 132 is in the shape of a circular arc and has a fixed central angle, and the radial dimension of the flow control member 132 is varied. In the graph in FIG. 7, the value of the prominence ratio of the disk drive apparatus which does not include the flow control member is assumed to be zero.

The measurements shown in FIG. 7 show that the value of the prominence ratio, which indicates the proportion of prominent discrete frequency noise in the audible frequency range, tends to decrease as the area of the flow control member 132 increases. This shows that as the area of the flow control member 132 increases, the noise which occurs while the disk drive apparatus 1 is in operation decreases.

While a preferred embodiment of the present invention has been described above, it will be understood that the present invention is not limited to the above-described preferred embodiment.

Figure 8:
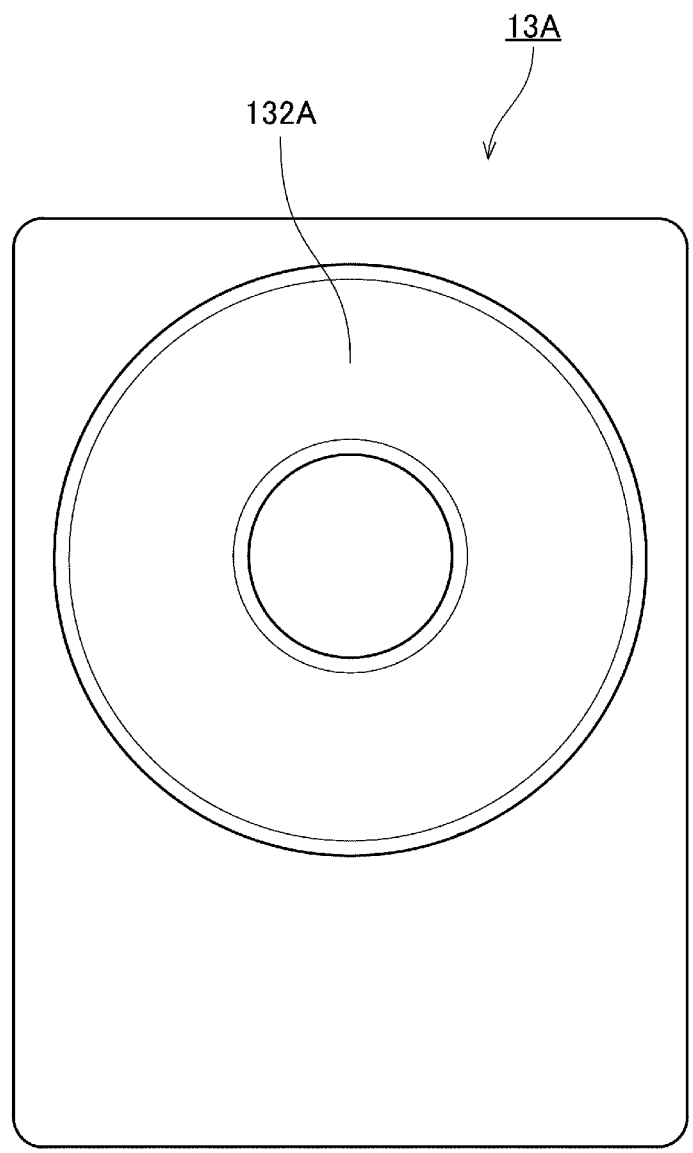
FIG. 8 is a bottom view of a top cover according to a preferred modification of the above preferred embodiment of the present invention.

FIG. 8 is a bottom view of a top cover 13A according to a preferred modification of the above-described preferred embodiment of the present invention. In the modification illustrated in FIG. 8, a flow control member 132A is annular and is centered on a central axis of a motor in a plan view. Thus, a lower surface of the flow control member 132A has a greater area than if the flow control member 132A were in the shape of a circular arc.

Figure 9:
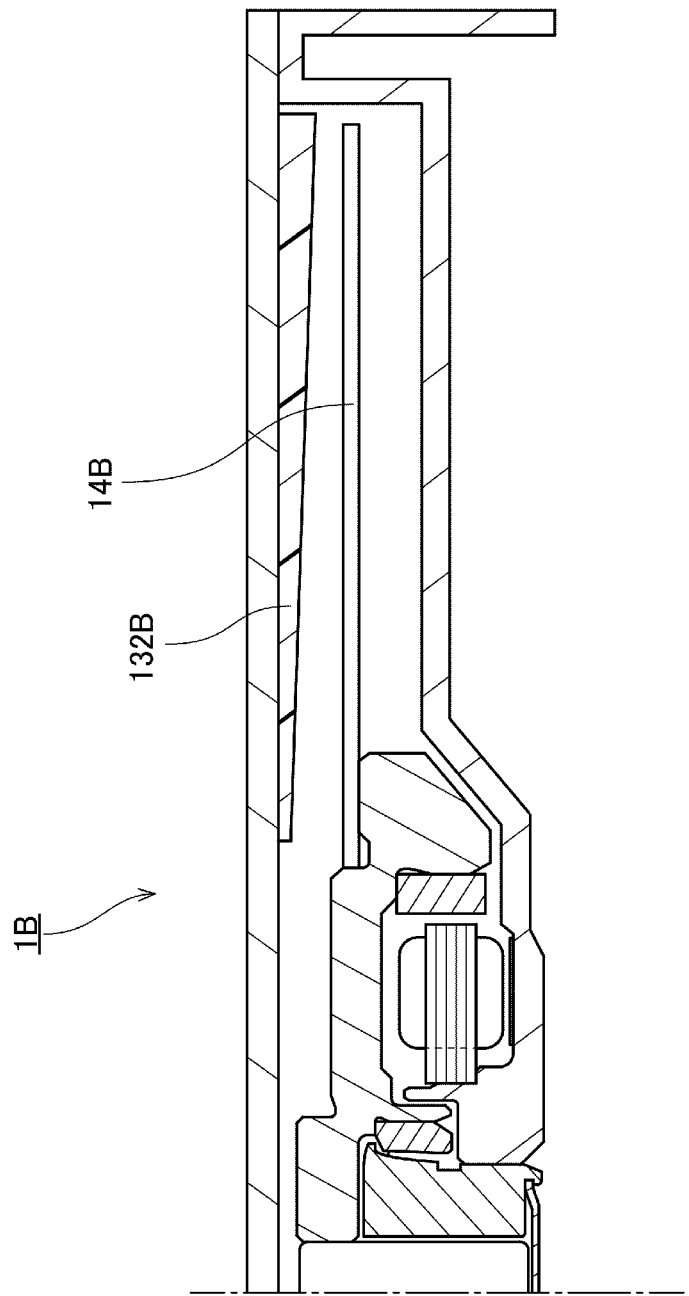
FIG. 9 is a partial vertical cross-sectional view of a disk drive apparatus according to a preferred modification of the above preferred embodiment of the present invention.

FIG. 9 is a partial vertical cross-sectional view of a disk drive apparatus 1B according to another preferred modification of the above-described preferred embodiment of the present invention. In the modification illustrated in FIG. 9, a lower surface of a flow control member 132B is arranged to decrease in level with increasing distance from a central axis of a motor. As a result, an axial distance between the lower surface of the flow control member 132B and an upper surface of a disk 14B is arranged to decrease with increasing distance from the central axis. This allows the axial distance between the lower surface of the flow control member 132B and the upper surface of the disk 14B to be particularly small near an outer circumferential portion of the disk 14B. This leads to an efficient reduction in noise which is caused by fluttering of the disk 14B. In addition, the axial distance between the disk 14B and the flow control member 132B is allowed to be relatively large near an inner circumferential portion of the disk 14B, which leads to a reduction in resistance against rotation of the disk 14B due to windage.

In the above-described preferred embodiment, a resin is used as the material of the flow control member. Note, however, that a material other than the resin may alternatively be used as the material of the flow control member. For example, the flow control member may alternatively be made of a metal, such as, for example, aluminum or an aluminum alloy. Use of the metal makes rigidity of the flow control member greater than use of the resin.

Note that a spindle motor included in a disk drive apparatus according to a preferred embodiment of the present invention may have a structure different from that of the spindle motor 11 according to the above-described preferred embodiment. Also note that a spindle motor included in a disk drive apparatus according to a preferred embodiment of the present invention may be, for example, a spindle motor of a so-called fixed-shaft type, in which a hub is arranged to rotate about a stationary shaft.

Preferred embodiments of the present invention are applicable to top covers and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A disk drive apparatus, comprising:
   a housing in which a disk is accommodated and rotatable about a central axis extending in a vertical direction;
   a top cover that closes an opening of the housing, the top cover including:
      a plate-shaped top cover body that extends perpendicularly to the central axis; and
      a flow control member fixed to a lower surface of the top cover body;
   a spindle motor that causes the disk to rotate about the central axis; and
   an access portion that performs at least one of reading and writing of information from or to the disk; wherein
   the housing supports the spindle motor and the access portion and defines a case together with the top cover;
   the top cover body is axially opposite to the disk;
   the flow control member includes a lower surface axially opposite to at least a portion of an upper surface of the disks;
   the access portion includes a head opposite to the disk;
   the flow control member is outside of a range over which the head moves in a plan view;
   at least a portion of the flow control member and at least a portion of the access portion radially or circumferentially overlap with each other; at least a portion of the flow control member and the head circumferentially overlap over the full range of head movement; and an axial distance between the flow control member and the disk decreases with increasing distance from the central axis.

2. The disk drive apparatus according to claim 1, wherein the flow control member is in a shape of a circular arc, and is centered on the central axis.

3. The disk drive apparatus according to claim 2, wherein the flow control member has a central angle of 180° or greater.

4. The disk drive apparatus according to claim 1, wherein the flow control member includes a first slanting surface at least at a portion of a periphery of the lower surface thereof.

5. The disk drive apparatus according to claim 4, wherein the flow control member includes a second slanting surface at least at one of both circumferential end portions thereof.

6. The disk drive apparatus according to claim 1, wherein the flow control member is made of a resin, and is an injection molded article produced with the top cover body as an insert.

7. The disk drive apparatus according to claim 1, wherein at least a portion of the lower surface of the flow control member is axially opposite to an outer circumferential end portion of an upper surface of the disk.

8. The disk drive apparatus according to claim 1, wherein
the housing includes an inner wall surface in a shape of a circular arc and located to surround the disk; and
each of an outer edge surface of the disk and an outer edge surface of the flow control member is radially opposite to the inner wall surface with a gap therebetween.

9. The disk drive apparatus according to claim 1, wherein $0.01 \leq \Delta g/D \leq 0.03$, where D is a diameter of the disk, and $\Delta g$ is an axial distance between the lower surface of the flow control member and an upper surface of the disk.

10. The disk drive apparatus according to claim 9, wherein
D=95 mm; and
0.95 mm$\leq \Delta g \leq$2.85 mm.

11. The disk drive apparatus according to claim 9, wherein
D=64 mm; and
0.64 mm$\leq \Delta g \leq$1.92 mm.

* * * * *